May 9, 1967   W. S. SUTOWSKI   3,318,645
BEARING UNIT AND METHOD OF ASSEMBLY
Filed Feb. 11, 1965

INVENTOR.
WALTER S. SUTOWSKI
BY

United States Patent Office 3,318,645
Patented May 9, 1967

3,318,645
BEARING UNIT AND METHOD OF ASSEMBLY
Walter S. Sutowski, 6976 Crestview Drive,
Brecksville, Ohio  44141
Filed Feb. 11, 1965, Ser. No. 431,898
12 Claims.  (Cl. 308—196)

My invention relates to an improved bearing unit and to a novel method of assembly the same.

An object of my invention is to provide a unique bearing device having novel characteristics and useful purposes.

Another object is the provision of a bearing device wherein a split outer race of the bearing device is firmly held so as to close the gap or split in the race against possible expansion of the outer race member.

Another object is the provision of a unitary device arranged for holding the inner and outer race members in firm position for retaining the balls therein.

Another object is the provision for enclosing the balls of the bearing device within a case for protection of the balls against injury and against dust.

Another object is the provision of a highly useful process for efficiently and economically assembling the improved bearing devices.

Other objects and a fuller understanding of the invention may be had by referring to the following description and claims, in conjunction with the accompanying drawings, in which:

The preferred form of my improved bearing device has an inner race member 11 of steel or other suitable material. The inner race member 11 has a raceway 11C adapted to accommodate a plurality of balls 13 arranged in a circle therearound. On the opposite axial sides of the raceway 11C are shoulders 11A and 11B facing in opposite directions.

Concentrically mounted around the inner race member 11 is an outer race member 12. This outer race member 12 is of the type that is split and is usually made of resilient steel or the like. The split in the outer race member 12 leaves a gap or split 12B at one location in its circumference. The resiliency of the outer race member 12 is such that it is resiliently biased toward contraction so as to maintain a plurality of balls 13 in the opposed raceways of concentric race members. However, the resiliency of the outer race member 12 is such that there tends to be a slight gap at the split 12A therethrough. The resilient bias of the outer race member 12 toward contraction is not sufficient to firmly close the gap 12B and particularly under radial stress and strain, and it is therefore necessary to provide additional support and confinement for the outer race member 12 so as to hold it in a true circle and to close the gap 12B.

The outer race member 12 has a raceway 12A which is disposed opposite the raceway 11C of the inner race member 11 so as to accommodate the plurality of balls 13 arranged in a circle between the opposed raceways.

Figure 1:
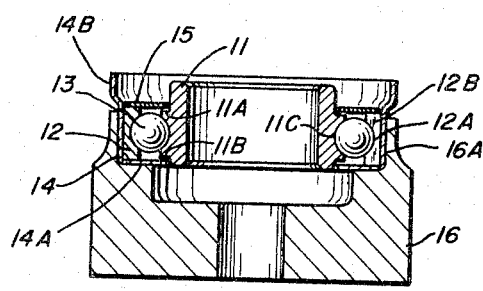
FIGURE 1 is a longitudinal sectional view through my improved bearing device at an initial stage of assembly.

There is provided a metal cup or case 14, preferably of soft steel. This cup 14 has a bottom wall 14A extending radially inward so as to project under the shoulder 11B of the inner race member 11, there being a central opening in the bottom wall 14A for accommodating the inner race member 11. The side walls of the cup 14 are generally cylindrical so as to accommodate therebetween the outer race member 12. The fit of the outer race member 12 within the cylindrical wall of the cup 14 is such that the outer race member 12 is compressed and snugly held so as to close the gap 12B formed by the splitting of the outer race member 12. By having the gap 12B substantially closed, a more continuous and smooth surface is provided by the raceway 12A of the outer race member 12. Above the cylindrical wall of the cup 14, the wall is flared outwardly and upwardly to form the upper end portion 14B shaped as illustrated in FIGURE 1. The diameter of the upper end portion 14B is substantially greater than the diameter of the cylindrical wall portion surrounding the outer race member 12.

A metal washer or apertured disk 15 is positioned downwardly in the flared upper end portion 14B to rest upon the upper side of the outer race member 12 and the shoulder 11A of the inner race member 11. The inner and outer annular edges of the washer 15 snugly engages the respective walls of the cup 14 and the inner race member 11.

Figure 2:
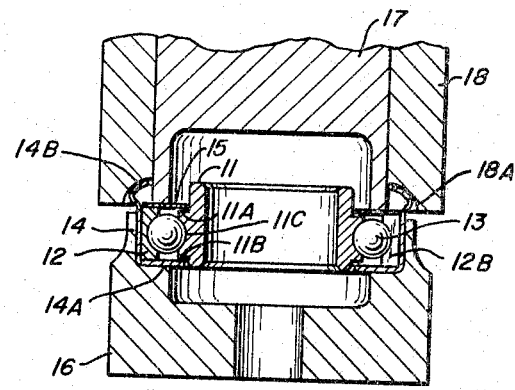
FIGURE 2 is a view somewhat like that of FIGURE 1 but showing a subsequent stage of the assembly.

To support the parts in position during the assembly herein described, the cup 14 is placed down in an annular recess 16A of a nest or support 16. The bottom of the recess 16A supports the cup 14 which in turn supports the race members 11 and 12 carried thereby, the balls 13 interposed between the race members, and the washer 15 resting upon the two race members. After the parts are in the position illustrated in FIGURE 1, then the upper end portion 14B is curled over and flattened so as to securely confine the washer 15 in position and to hold the race members firmly within the cup 14. The first operation is illustrated in FIGURE 2 wherein a holddown tool 17 comes down and firmly holds the washer 15 downwardly against the top of the outer race member 12. While the washer 15 is thus held down, a forming punch 18 concentrically mounted about the hold-down tool 17 moves axially downward relative to the hold-down tool 17 and against the flared upper end portion 14B. As seen in FIGURE 2, the lower end of the forming punch 18 has a curved shaping end 18A extending circumferentially therearound and is formed to curl inwardly the upper end portion 14B to the shape illustrated in FIGURE 2.

After the parts are partially formed to the shape illustrated in FIGURE 2, then the tools 18 and 17 are raised and moved out of the way. Thereafter another combination tool made up of parts 19 and 20 is brought down over the assembly and moved axially toward the nest or base 16. The confining tool 20 is moved downwardly to the position shown in FIGURE 3 so as to confine the outer edge of the curled upper end portion 14B and to prevent the same from spreading radially outward. Thereafter the flattened punch 19 moves axially downwardly relative to the confining tool 20 and downwardly upon the curled upper end portion 14B to flatten the same downwardly and firmly against the washer 15, and to thus lock the washer 15 in position and to firmly hold the outer race member 12 between the washer 15 and the base portion 14A of the cup 14. There is a slight clearance left between the shoulder 11A and washer 15 and between the shoulder 11B and the bottom wall portion 14A so as to permit the inner race member 11 to rotate within and relative to the outer race member 12, the balls 13 revolving around in the opposed raceways of the race members.

Figure 3:
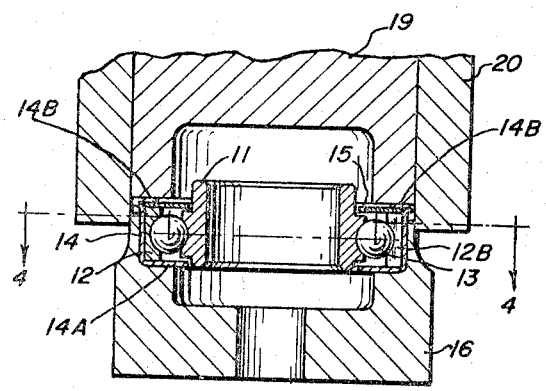
FIGURE 3 is a view somewhat like that of FIGURES 1 and 2 but showing the final stage of the assembly and illustrating the bearing device in final assembled form.
Figure 4:
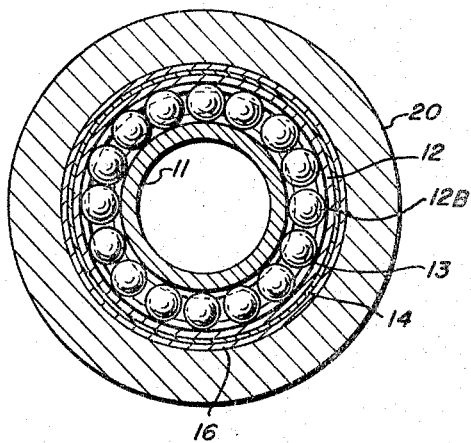
FIGURE 4 is a cross-sectional view through the line 4—4 of FIGURE 3.

In the manner illustrated, a unique and highly useful bearing device is assembled which is ready for use. After it has been formed to its shape as shown in FIGURE 3, the tools 19 and 20 are raised and moved out of the way and the assembled bearing device is lifted out of the nest or base 16 and is ready for use.

The present disclosure includes that contained in the appended claims, as well as that of the foregoing description.

Although this invention has been described in its preferred form and preferred practice with a certain degree of particularity, is is understood that the present disclosure of the preferred form and preferred practice has been made only by way of example and that numerous changes in the details of construction and the combination and arrangement of parts and steps may be resorted to without departing from the spirit and scope of the invention as hereinafter claimed.

What is claimed is:

1. A bearing device comprising in combination an inner race, a plurality of balls, and a split outer race resiliently contracted about the balls arranged in a circle between the concentrically arranged race members, the outer race member being expansible to open the gap at the split thereof, a metal cup member receiving the assembled race members and balls therebetween, said cup member snugly embracing the outer race member to prevent expansion thereof, a metal washer member engaging a first axial end of the outer race member and overlying the inner race member, said cup member having a bottom wall engaging the opposite axial end of the outer race member, having a portion folded upon itself adjacent said first axial end of the outer race member and protruding radially outwardly to provide a reinforcing annular flange, and having an upper end wall extending radially inward from said flange and formed over said washer member to confine the washer member and to hold the washer member in engagement with said outer end wall, said outer race member being tightly embraced by said cup member and washer member and said inner race member being held between the said bottom wall and washer to be rotatable relative thereto.

2. A bearing device as claimed in claim 1 and in which said upper end wall is an initially flared end of the cup member which is curled inward and flattened down on the washer member to confine the outer race member between said bottom wall and said washer member.

3. A bearing device as claimed in claim 1 and in which said bottom wall of the cup member and said washer member have aligned openings for accommodating said inner race member and in which the inner race member has oppositely facing annular shoulders disposed between the peripheral edge portion of said aligned openings.

4. A bearing device comprising in combination, a metal cup member having a first end wall and a second end wall joined by a cylindrical wall, said cup member having a reinforcing annular flange extending radially outwardly at the junction of said cylindrical wall and said second end wall, an assembly of inner race member, a split outer race member and a plurality of balls arranged in a circle between the race members, the outer race member being expansible to open the gap of the split therein, said assembly being positioned in said cup member and the cylindrical wall thereof tightly embracing said outer race member to substantially close said gap and prevent expansion of the outer race member, said outer race member engaging said first end wall, a washer member disposed between said outer race member and said second end wall to be confined therebetween, said flange being formed by the metal walls of the cup member being folded upon itself to extend radially outwardly from said junction, said second end wall being formed by the metal walls of the cup member being pressed radially inwardly from said flange and axially tightly against said washer member, the outer race member being tightly embraced between said first end wall and said washer.

5. A bearing device as claimed in claim 4 and in which said first end wall and said washer member extend substantially across between the concentric race members to enclose said balls.

6. A bearing device as claimed in claim 4 and in which the inner race member has annular shoulders extending therearound on opposite sides of the raceway of the inner race member, and in which said first end wall and said washer member overlie said shoulders to confine the shoulders between the first end wall and washer member while permitting rotation of the inner race member relative to said first end wall and washer member.

7. The process of making a ball bearing device comprising the steps of, providing a metal cup member having a cylindrical wall, an apertured end wall at one end of the cup member and an outwardly flared end portion at the opposite end of the cup member, providing an assembly of inner race member, a split outer race member concentrically positioned about the inner race member, and a plurality of balls positioned in a circle between the race members, said split outer race member being resilient and being expansible, providing an apertured metal washer member, placing said assembly in said cup member to place the outer race member in engagement with said apertured end wall thereof, placing said washer member in said flared end portion in axial alignment with said assembly and in engagement with said outer race member, distorting said flared end portion to press the same firmly against said washer member and confine the outer race member intermediate said apertured end wall and said washer member said step of distorting including the folding of the said flared end portion upon itself in the general plane of said washer member and radially outwardly therefrom to provide a reinforcing annular flange about said washer member.

8. The process as claimed in claim 7 and including the step of overlying a portion of the inner race member at opposite ends thereof with said end wall portion and washer member for accommodating the inner race member therebetween and permitting relative rotative motion of the inner race member in respect to said end wall portion and washer member.

9. The process of making a ball bearing device comprising the steps of assembling an inner race member, an outer race member disposed concentrically therewith, and a plurality of balls arranged in a circle between the concentric race members, providing a cup member of formable metal having a lateral wall at one end, a cylindrical wall extending from the lateral wall, and an outwardly flared wall extending from the cylindrical wall at the opposite end, providing a disk member having an outer diameter substantially the same as the inner diameter of said cylindrical wall, placing said assembly of race members and balls in the cup member and in axial alignment therewith to interengage said lateral wall and said outer race member, placing said disk member through said flared wall into the cup member and in axial alignment therewith to interengage said disk member and said outer race member, and deforming said flared wall to extend radially outwardly from the said cylindrical wall in the general plane of said disk member and then folded back radially inwardly along the outer side of the disk member to be disposed laterally in tight engagement with said disk member and substantially parallel therewith to tightly confine said outer race member between said lateral wall and said disk member.

10. The process as claimed in claim 9 and including the steps of providing said inner race member with oppositely directed axially spaced shoulders, and providing said lateral wall and said disk member with axially aligned openings for receiving said inner race member therethrough, said lateral wall and disk member adjacent said openings being in axial alignment with said shoulders to confine the shoulders between the lateral wall and disk member.

11. The process of making a ball bearing device comprising the steps of providing an inner race member, a plurality of balls and a split outer race member of resilient metal expansible to enlarge the diameter of the same, assembling said race members and balls to place the race members concentrically and the balls in a circle therebetween, providing a deformable metal cup member having a lateral wall at one end, a cylindrical wall extending therefrom, and an extended wall of enlarged diameter extending from the cylindrical wall at the other end, providing a flat metal disk member having an outer diameter complementing the inner diameter of said cylindrical wall, placing the said assembly of inner and outer race members and balls in said cup member to closely confine the outer race member with said cylindrical wall to prevent expansion of the outer race member, and to interengage the outer race member with said lateral wall, placing said disk member into the cup member through said extended wall to interengage the disk member with said outer race member and to dispose the disk member parallel with said lateral wall, curling said extended wall radially outwardly from said cylindrical wall and thence radially inwardly over the peripheral edge portion of the disk member and flattening the curled extended wall against said disk member to embrace the outer race member between the disk member and lateral wall and to provide a reinforcing annular flange about said cylindrical wall at said disk member.

12. The process as claimed in claim 11 and including providing the said lateral wall and disk member with openings aligned with each other for accommodating the inner race member within said openings, and providing the inner race member with an annular portion projecting radially outward to between said lateral wall and disk member adjacent the said openings.

References Cited by the Examiner

UNITED STATES PATENTS 2,023,718  12/1935  Adams _____ 308—187.2
2,654,644  10/1953  Sutowski _____ 308—196

FOREIGN PATENTS 558,527  5/1923  France.

MARTIN P. SCHWADRON, *Primary Examiner.*
FANK SUSKO, *Examiner.*